(12) United States Patent
Orth et al.

(10) Patent No.: US 9,970,814 B2
(45) Date of Patent: May 15, 2018

(54) METHOD FOR PROCESSING ITEMS AND DEVICE AND USE THEREOF

(71) Applicant: Airbus Defence and Space GmbH, Taufkirchen (DE)

(72) Inventors: Tilman Orth, Munich (DE); Jonas Gruenewald, Munich (DE); Christian Weimer, Munich (DE)

(73) Assignee: Airbus Defence and Space GmbH (DE)

( * ) Notice: Subject to any disclaimer, the term of this patent is extended or adjusted under 35 U.S.C. 154(b) by 0 days. days.

(21) Appl. No.: 15/642,751

(22) Filed: Jul. 6, 2017

(65) Prior Publication Data
US 2018/0017440 A1   Jan. 18, 2018

(30) Foreign Application Priority Data
Jul. 12, 2016   (EP) ..................................... 16179094

(51) Int. Cl.
| | |
|---|---|
| *G01D 18/00* | (2006.01) |
| *G01J 1/44* | (2006.01) |
| *G01J 1/42* | (2006.01) |
| *G21K 5/00* | (2006.01) |

(52) U.S. Cl.
CPC .................. *G01J 1/44* (2013.01); *G01J 1/429* (2013.01); *G01J 1/4228* (2013.01); *G21K 5/00* (2013.01); *G01J 2001/444* (2013.01)

(58) Field of Classification Search
CPC .............................. G06F 3/042; G06F 3/0488
See application file for complete search history.

(56) References Cited

U.S. PATENT DOCUMENTS

| | | | | |
|---|---|---|---|---|
| 9,207,851 B1* | 12/2015 | Han | ....................... | G06F 3/0421 |
| 2006/0163491 A1* | 7/2006 | Angal | ................ | G01N 21/6456 |
| | | | | 250/458.1 |
| 2011/0310398 A1* | 12/2011 | Okano | ................... | G01N 21/55 |
| | | | | 356/600 |
| 2012/0274564 A1* | 11/2012 | Cronjaeger | ........... | G06F 1/3259 |
| | | | | 345/166 |
| 2015/0083933 A1 | 3/2015 | Eliason et al. | | |

(Continued)

FOREIGN PATENT DOCUMENTS

| | | |
|---|---|---|
| DE | 10 2015 013697 A1 | 4/2016 |
| DE | 10 2014 018934 A1 | 6/2016 |

OTHER PUBLICATIONS

EP 16179094.4 Search Report dated Feb. 9, 2017.

*Primary Examiner* — Kiho Kim
(74) *Attorney, Agent, or Firm* — Lerner, David, Littenberg, Krumholz & Mentlik, LLP

(57) ABSTRACT

A device for processing items, in particular items in a production sequence, in different processing steps, has at least one sensor arrangement having a plurality of sensors, wherein at least one item is measured in a detection mode by at least a partial quantity of the sensors as the detection means, wherein an impacting of the at least one item with an irradiation means is determined by a control means while considering a result of the measuring procedure of the at least one item; and wherein the at least one item is irradiated in an irradiation mode by at least a further partial quantity of the plurality of sensors as the irradiation means. If appropriate, at least part of the method is repeated with a renewed measuring, determination and/or irradiation.

20 Claims, 2 Drawing Sheets

(56) References Cited

U.S. PATENT DOCUMENTS

| | | | |
|---|---|---|---|
| 2015/0351192 A1* | 12/2015 | Newton | H05B 33/0869 362/97.1 |
| 2016/0007423 A1* | 1/2016 | Aliakseyeu | H05B 33/0845 315/292 |
| 2016/0119996 A1 | 4/2016 | Eliason et al. | |
| 2016/0183327 A1 | 6/2016 | Engel et al. | |

* cited by examiner

METHOD FOR PROCESSING ITEMS AND DEVICE AND USE THEREOF

FIELD OF THE INVENTION

The invention relates to a method for processing items, in particular items in a production sequence, in different processing steps. The invention also relates to a device for processing items, by which device the mentioned method in particular can be carried out, and it also relates to the use of said device in a production process.

BACKGROUND OF THE INVENTION

Today, the irradiation of items or even people is used universally, in industry, in trade, in the household, during leisure time or in medicine. In particular, irradiation procedures are used at different points in industrial processes, for example for heating semi-finished products or for activating chemical reactions. To achieve the distribution of radiation required for this purpose, generally a homogeneous distribution, a specific device is required which is configured for a respective specific component, for a specific shape. Human intervention is necessary in order to adapt a device of this type to different components/shapes.

When irradiating the respective item or items, a radiation source is usually used which has a defined radiation characteristic. Radiators of this type are usually arranged in fields and are fixed in this arrangement. These fields of radiators are configured by an operator for the respective use. Examples include, for example, infrared radiators for heating semi-finished products, UV radiators for curing paints or resins or infrared radiators for drying surfaces. These devices are usually directed onto the surface to be irradiated, then switched on and switched off again at the end of a defined time or upon reaching a particular measurement result.

If relatively complex shapes, such as three-dimensional surfaces with recesses, are to be irradiated uniformly, this has to be considered before the irradiation device is used by adapting the construction or by adjusting an intensity distribution. The reason for this is that the incident radiant power decreases with the square of the distance from the radiation source, i.e. the power has a dependence proportional to $1/r^2$. In addition, most radiation sources do not have a homogeneous radiation characteristic over the solid angle. Furthermore, different materials absorb electromagnetic radiation at different wavelengths to different extents. Radiators of this type can be connected for example in zones which can be controlled individually. These zones are always at least as big as one radiation source, thus in the above-mentioned case, an infrared lamp. Consequently, irregularities in distribution occur which are potentially undesirable for many processes or which rule out irradiation as a process technology.

BRIEF SUMMARY OF THE INVENTION

It is therefore an idea of the present invention to provide a method and a device, which device allows a measurement and subsequent irradiation of items using simple means and in an economical manner.

Accordingly, the realization of said idea consists in measuring in the method at least one item, using at least one sensor arrangement having a plurality of sensors, by means of at least a partial quantity of the sensors as a detection means in a detection mode, then determining by a control means the impacting of the item with an irradiation means, while considering a result of the measuring of the item, and finally irradiating the item by at least a further partial quantity of the plurality of sensors as an irradiation means in an irradiation mode; if appropriate, at least part of the method is repeated with renewed measuring, determination and/or irradiation.

Equally, the above idea is also achieved by a device for processing items, comprising a detection means having at least one sensor arrangement with a plurality of sensors, at least one item being measured by means of at least a partial quantity of the sensors in a detection mode; a control means determining an impacting of the item by an irradiation means, while considering a result of the measuring of the at least one item, and at least a further partial quantity of the plurality of sensors irradiating the at least one item as the irradiation means in an irradiation mode. Therefore, according to an aspect of the invention, sensors are used to measure the item which is to be subsequently irradiated, and to obtain the dimensions thereof, to computationally calculate the parameters required for an optimum irradiation from the result of this determination and subsequently to irradiate the item in question as desired by the radiation sources which were previously used as sensors. Thus, the invention is essentially based on the fact that radiation sources are used which are capable of acting not only as radiation sources but also as detectors.

Another embodiment of the method according to the invention and of the device in which the sensors can be used and can be connected as a detector and as a radiation source, which can be effectively controlled and provides a good luminous efficiency, can consist in configuring each of the sensors of the sensor arrangement by a light-emitting diode (LED). This approach is based on firstly charging the LEDs against their transmitting direction and then measuring the time which they require for a full discharge. This time depends on how much light energy is incident thereon. This type of measurement can already be implemented using minute circuits and it provides an excellent signal-to-noise ratio (S/N). However, an LED can generally only detect radiation which lies within a very narrow range around the wavelength which it itself emits.

Further developments which allow a good handling using the sensors of the sensor arrangement and which make the use thereof flexible can consist in the fact that, in the case of developments of the method and device according to an embodiment of the invention, the sensors of the arrangement can be activated or are activated individually, combined severally together and combined into groups. Here, the sensors of the sensor arrangement can form, for example, an array of sensors, for example an array of this type with individual sensors, with partial quantities of sensors or collectively can have a regular arrangement over a surface to be irradiated. Thus, for example the device can comprise a field with LEDs which are interconnected such that they are capable of measuring an incident luminous flux and of actively operating as radiation sources. Fields of this type can form, for example, flat LED modules which are capable of heating relatively large components.

For this purpose, the LEDs are mounted for example in a close arrangement on a board. To irradiate a surface, the LEDs can then be activated individually and the intensity thereof can be controlled. In the simplest case, the surface to be irradiated is approximately parallel to the LED board.

Due to the arrangement of the LEDs, with the same radiation intensity of all the LEDs, a bell curve is obtained for the radiation impacting the surface, over the width of the board, with a maximum in the centre and with less radiation in the peripheral region. The same applies in the second dimension. Therefore, in order to achieve a homogeneous radiation on the surface, the peripheral regions must radiate more intensively than the centre. A distribution of this type usually has to be calculated in a simulation model and then converted into a program by an operator.

At this point, the device starts to itself determine a distribution of this type. For this purpose, for example the LEDs are activated in specific patterns, such as a chessboard arrangement. In this respect, for example one half of the LEDs are operated in the detector mode, while the other half operates as a radiation source. The radiating LEDs emit radiation which is reflected by the surface of the component and is measured by the LEDs which are in the detector mode. For the example of a flat plate, the detector LEDs in the centre would detect significantly more radiation if all the radiating LEDs radiate with the same intensity. The measured values can be saved in a program. The chessboard pattern can then be reversed and the measurement can be completed in this way. Accordingly, further variants of the method according to the invention consist in connecting or activating the sensors of the arrangement differently such that a partial quantity of sensors is operated in a detector mode as the detector means and a partial quantity of the sensors is operated in the irradiation mode as the irradiation means. The mentioned operating modes of the respective partial quantities of sensors can change after a predeterminable or predetermined period of time, and the partial quantities of sensors of the respective mode can form a pattern, for example a regular pattern, for example the above-mentioned chessboard pattern.

Here, the mentioned chessboard pattern is not to be understood as a fixed arrangement, but merely as an example. Theoretically, all possible arrangements and combinations can be implemented. These then have to be calculated by a computer model in which all the information regarding the radiation sources, for example the radiation characteristic thereof (the intensity over the solid angle etc.) and other geometric information is stored. As a result, it is possible for significantly more precise distributions to be measured.

In a variant of the method at least a partial quantity of sensors is activated by the control means such that a surface of the item to be irradiated is exposed to a radiation intensity which is uniform over the surface.

To rule out environmental influences during the measuring procedure of the at least one item or of a plurality of items, a further expedient variant of the method according to the invention can provide that a calibration measurement is optionally carried out before the at least one item is measured, in which calibration measurement the sensors which are used, for example all the sensors, are in the detection mode. As a result, the influence of the ambient lighting is eliminated for example in the subsequent calculation.

Furthermore, a variant is also conceivable in which disjoint partial quantities of sensors are operated simultaneously as the detector means and as the irradiation means.

To be able to appropriately determine the required type of irradiation of the respective item which does not necessarily have to be a homogeneous irradiation (although it frequently is), another variant of the method according to the invention can consist in determining an irradiation, to be carried out, of the item using sensors in an irradiation mode by an iterative process, in the steps of which an intensity variable of the irradiation treatment is measured once or several times by at least a partial quantity of sensors in the detection mode and is changed by the control means, or the control means analytically calculates and fixes the intensity variable of the irradiation treatment using sensors in an irradiation mode.

Thus, two courses of action are possible: a computer program can adapt the intensity of the radiating LEDs in an iterative process until a distribution of the detector LEDs, which is for example as homogeneous as possible (or another desired distribution), is measured. For this purpose, the radiation intensity would be slightly altered, a renewed measurement would be made using a double chessboard pattern and then the measured values would be checked for homogeneity. This process can be continued until a defined criterion is reached or until similar abort criteria, used in iterative optimisation processes, are present. The result is an intensity distribution of the two overlaid patterns which provide an intensity distribution for the actual irradiation.

A distribution can also be calculated analytically by means of a computer program. The only difference from the first variant is that here, the iterative procedure is not used. This variant requires a significantly more complex program which reproduces more complex mathematical connections.

Thereafter, the irradiation can be carried out with the calculated radiation distribution. The irradiation can be influenced by particular parameters, such as a surface temperature which is to be attained. This would only be considered as a multiplier for the calculated intensity distribution. This would then be, for example, the only information to be provided by the operator.

Conventional irradiation means require for a defined irradiation that the item to be irradiated is positioned in a particular location within the field of radiators so that radiation will be carried out in the precise actual location of the item. If this is not observed, some of the radiation is lost and a part of the item is not irradiated as intended.

Due to the detection at the start of the process, it is possible to determine where one or more items are actually located, i.e. which region has to be irradiated. If an object is not in a location, thus changed, this can be seen from the measuring signal, and this region can be omitted.

In this way, a small item can also be irradiated using a large array of LED radiators as sensors, without the necessity of adapting the circuitry or the like.

This can also be transferred to a use in which an item to be irradiated is located on a different surface, for example a semi-finished product in a tool. Here, a large number of different semi-finished product/tool combinations can be optimally irradiated using a single LED irradiation means, without a program having to be created for this purpose.

Likewise, new items can be irradiated without being previously set up.

In continuous processes, items such as foodstuffs, component parts or semi-finished products are moved past irradiation means and are irradiated. In this respect, a plurality of items usually run next to one another or the semi-finished products have available a particular width. Both can change during the process, between batches or also generally, for example in order to operate production capacities in a continuously optimum manner. As a result, regions in the process are also often irradiated which are empty at this time because no item is present. The device according to the invention and the method can suitably compensate for this in that, during the start of the process, the place is detected where items which need to be irradiated are actually located. This detection can also be carried out during the process and does not require any human intervention. Consequently, it is possible to reduce costs in terms of energy and staff.

Inter alia, for such scenarios, in an embodiment of the device according to the invention each of the sensors of the sensor arrangement can be respectively controlled at least in respect of its radiation intensity.

It is of particular importance that, by means of the device according to the invention, together with the method, it is possible to homogeneously irradiate three-dimensional structures, more specifically without a high configuration, calculation or operating expense. Due to the measuring procedure, it is possible to characterise the reflection behaviour of the item and, in this way, to calculate an intensity distribution which fulfils the required parameters, such as a homogeneous irradiation. The measured values, recorded by the LEDs in the detector mode are directly related to the distance of the surface from the radiation sources. Furthermore, angles in the surface also have an influence on the measured result. By different arrangements of the sensors/radiation sources, these can also be detected, so that an expedient variant of the method according to the invention can consist in also detecting profiled, non-planar structures of the item in the measuring procedure by different arrangement patterns and/or connection patterns of the sensor arrangement and/or relative positions of the detection means and of the item to be measured, and in subsequently irradiating them, if appropriate, after a corresponding calculation.

There are various possible uses for this, because surfaces which are curved, graduated, interrupted or combinations of the mentioned characteristics can be irradiated as required in this manner.

For this, developments of the invention can be expedient in which the at least one item and the sensor arrangement of the plurality of sensors are provided such that they are movable relative to one another by at least one adjusting device. Furthermore, for example the at least one item and at least a partial quantity of sensors of the sensor arrangement can form mutually parallel surface portions in the position of use. For this purpose, it could be imagined, for example, that a plurality of operating cycles of the method is carried out on a complex shape of an item, in which operating cycles another surface, which is respectively positioned parallel to a sensor arrangement by whichever's relative movement, is measured, the calculation of an optionally previously performed irradiation is also considered and is then irradiated (again).

Using the device according to an embodiment of the invention and the method, it is also possible to consider other aspects of the irradiation procedure in the form of the surface, in other words of the irradiated material. The reflection characteristics of an item not only depend on its shape, but also on the material. In this respect, the nature of the surface (rough/smooth), the colour or the structure can play a part.

In the device according to an embodiment of the invention, the sensors of the sensor arrangement can be formed by diodes of different colours. Here, the different colours of the sensors can cover a wavelength range of a few 100 nm, for example extending between the UV range and the NIR range.

While LEDs usually only operate as radiation sources/sensors within a very narrow frequency band, a plurality of colours can also be displayed by combinations of different-coloured LEDs. Furthermore, LEDs are also available in the UV and NIR ranges.

While a partial quantity of LED sensors of one colour radiates, another partial quantity of sensors records the reflected or transmitted radiation (for example in the case of films). Due to the combination of the different sensor/radiation sources, broad spectra of the UV-NIR range can be covered even with few wavelengths.

The information which is obtained corresponds to the results of a large-surface spectroscope, using which it is possible to measure complete components instead of individual small samples.

Uses for this are initially material characterisations, contamination detection or the like.

The use of a device according to an embodiment of the invention as well as the use of the method is particularly advantageous for processing items in a production sequence.

The above embodiments and developments can be combined together in any meaningful manner. Further possible embodiments, developments and implementations of the invention also include combinations, not explicitly mentioned, of features of the invention described previously or in the following in respect of the embodiments. In particular, a person skilled in the art will also add individual aspects as improvements or supplements to the respective basic form of the present invention.

BRIEF DESCRIPTION OF THE DRAWINGS

In the following, the invention will be described in more detail in the drawings on the basis of embodiments. Here, in a partly schematic form.

In all the figures, identical or functionally identical elements and devices have been provided with the same reference numerals, unless indicated otherwise.

DETAILED DESCRIPTION

Figure 1:
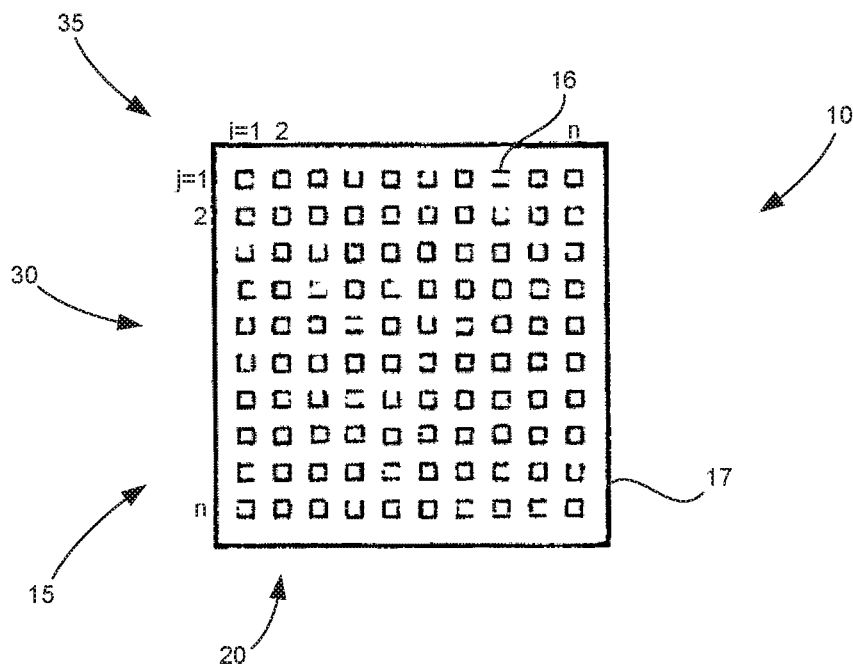
FIG. 1 is a plan view of a first embodiment of the device with a sensor arrangement which consists of an LED array and which can be operated in detector mode and in irradiation mode.

FIGS. 1 to 4 show a device, denoted in its entirety by reference numeral 10, for processing items 35, having a detection means 20 with at least one sensor arrangement 15 having a plurality of sensors 16, at least one item 35 being measured by at least a partial quantity of the sensors 16 in the detection mode; a control means (not shown) determining an impacting, to be carried out, of the item 35 by an irradiation means 30, while considering a result of the measuring procedure of the at least one item 35, and at least a further partial quantity of the plurality of sensors 16 irradiating the at least one item 35 as the irradiation means 30 in an irradiation mode.

In this respect, FIG. 1 shows an embodiment of the device 10, in which the sensor arrangement 15 consists of an array of sensors 16 formed from LEDs which are interconnected such that they are capable of measuring an incident luminous flux and they are also capable of actively operating as radiation sources. In the latter type of operation, they are capable, for example, of heating relatively large components as items 35. For this purpose, the sensors 16, which are shown, of the sensor arrangement 15 as LEDs are mounted in a close arrangement on a board 17, which is square in this case. This board is shown by way of example in the drawing, the individual LEDs are identified by indices. In order to irradiate a surface, the sensors 16/LEDs can be activated individually and the intensity thereof can be controlled. In the simplest case, the surface to be irradiated is arranged parallel to the LED board 17.

Figure 2:
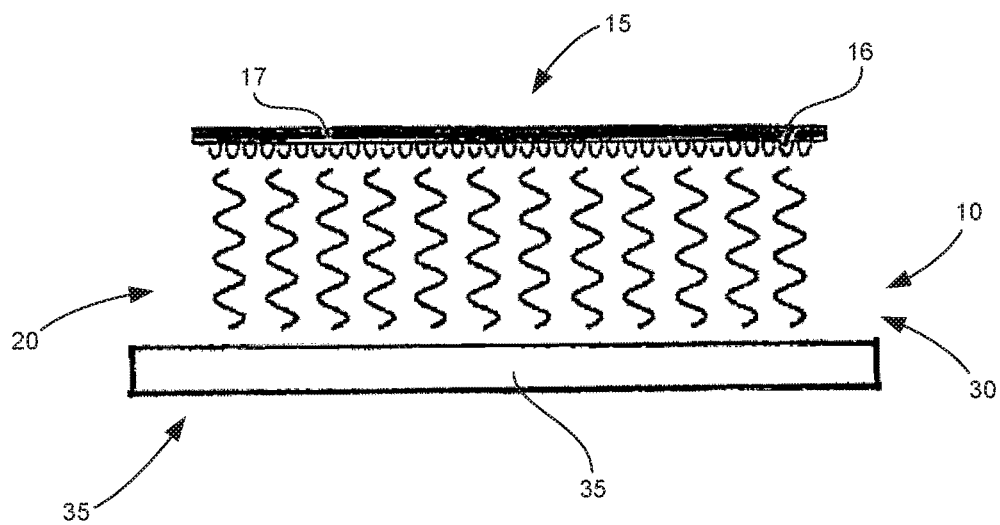
FIG. 2 is a side view of the array from FIG. 1 which, in irradiation mode, emits radiation in the direction of a surface to be irradiated.

FIG. 2 shows the sensor arrangement 15 of the device 10 which, with its sensors 16 configured as LEDs, irradiates an item 35 in the form of a surface 36. Due to the arrangement of the sensors 16, with the same radiation intensity of all the LEDs, a bell curve is produced for the radiation incident on the surface of the item 35, over the width of the drawing shown above, with a maximum in the centre and with less radiation in the peripheral region of the item 35. The same applies in the second dimension which extends into the viewing plane, transversely thereto. In order to achieve a homogeneous irradiation on the surface of the item 35, the peripheral regions of the array of sensors 16 must therefore radiate more intensively than the centre thereof. A distribution of this type is calculated in a simulation model of the control means (not shown) and is subsequently converted into a program.

Figure 3:
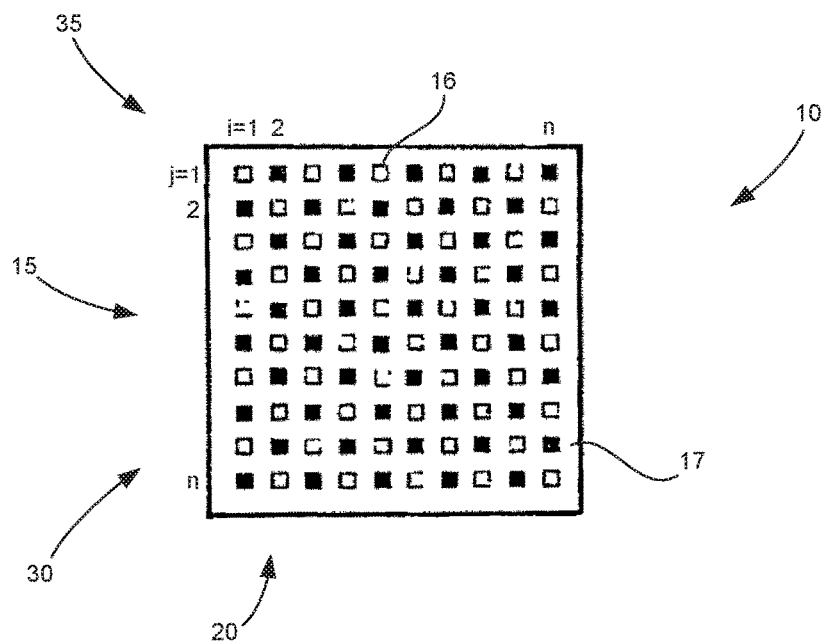
FIG. 3 is a plan view of a further embodiment of the device with a sensor arrangement consisting of an LED array, in which sensor arrangement a partial quantity of the sensors is operated in irradiation mode, while another partial quantity of the sensors is operated in detection mode.

To be able to satisfactorily achieve a conversion of this type, the corresponding distribution itself is determined by the device according to the invention, as can be clearly seen from FIG. 3. In this figure, the sensors 16 are activated in specific patterns, for example as a chessboard arrangement, on the board 17, which here again is square. In this respect, one half of the LEDs is operated in detection mode, while the other half operates as a radiation source, which is shown by the "light" sensors 16 as sensors 16 in the irradiation mode and by the "dark" sensors 16 in the detection mode. In this respect, the radiating LEDs emit radiation which is reflected by the surface of the item 35 and is measured by the LEDs which are in the detection mode. Taking the example of the planar board, as can be seen for example as the item 35 in FIG. 2, the detector LEDs as sensors 16 would detect significantly more radiation in the centre if all the radiating LEDs radiate with the same intensity. The measured values can be saved in a program.

Thereafter, the chessboard pattern can be reversed and in this way the measurement can be completed. After this reversal, the sensors 16 which were previously respectively operating in the detector mode then operate as the radiation source in the irradiation mode, and vice versa. The sensors 16 of the sensor arrangement 15 thereby respectively form partial quantities of sensors 16 which, in the present example, are in fact disjoint, but this does not necessarily have to be the case.

Two courses of action are then possible with the device 10:

a) In an iterative process, a computer program can adjust the intensity of the radiating LEDs until a distribution of the detector LEDs is measured which is as homogeneous as possible. For this purpose, the radiation intensity would be changed slightly, a new measurement would be carried out using a double chessboard pattern and then the measured values would be checked for homogeneity. This process can be continued until a defined criterion is reached or until similar abort criteria are present which are used in iterative optimisation processes. The result is an intensity distribution of the two overlaid patterns which provide an intensity distribution for the actual irradiation.

b) A distribution can be calculated analytically also by means of a computer program. The only difference from the first variant is that here, the iterative procedure is not used. This variant requires a significantly more complex program which represents more complex mathematical connections.

Thereafter, the irradiation can take place by the sensors 16 as LEDs with the calculated radiation distribution.

Figure 4:
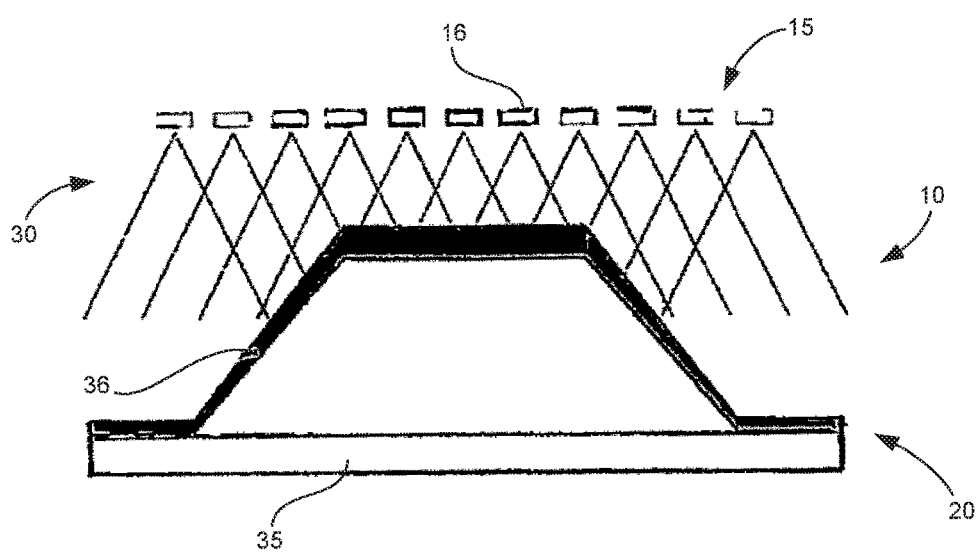
FIG. 4 is a side view of a further embodiment of the device with an LED array, by which a three-dimensional item is irradiated, a differing intensity distribution resulting on the surface of the item due to the distance from the radiation sources.

Finally, FIG. 4 shows the possibility of homogeneously irradiating three-dimensional structures as the item 35 by the device 10 according to the invention, more specifically without a considerable configuration, calculation or operating expense, FIG. 4 also showing the problem which usually occurs in this respect.

If the surface of an item 35 is irradiated by a radiation source, the irradiance E on this surface depends on the radiation intensity and on the distance from the radiation source. The radiation intensity I is constant over the solid angle (the radiation characteristic of the radiation source is not considered for this), so that the irradiance only depends on the distance from the radiation source, since the surface irradiated over a given sold angle increases quadratically with the distance r from the source. Accordingly, the connection can be formulated by $E=I/r^2 \cdot \cos(\cdot)$:

the cosine considers the angle between incident radiation and the surface normal, i.e. the projected surface.

With an appropriate intensity distribution of the radiators, a homogeneous distribution can, however, also be achieved in the case of three-dimensional surfaces of an item 35. As already described in an exemplary manner by the embodiments of FIGS. 2 and 3, for this purpose, the centre radiators would again have to radiate less intensively than the outer radiators. It is helpful in this respect for the sensors 16 of the sensor arrangement 15 to be as small as possible as radiation sources, i.e. for the realisable grid to be as fine as possible. This is accommodated by the approach of using LEDs as sensors 16/radiation sources.

In this regard, FIG. 4 shows an item 35 which is irradiated by sensors 16, which is shown schematically by the regular cones. Due to the distance from the source, a differing intensity distribution is produced on the surface of the item 35, which is indicated by the area 36, coloured in different "thicknesses", above the surface of the item 35.

Calculating an intensity distribution of this type requires a precise knowledge of the shape of the body, and also of the position in the radiation field produced by the radiating sensors 16. The expense for this is not small and requires simulation and calculation software. A distribution, calculated in this way, is then only ever valid for a particular shape of the item 35 in a defined position and has to be re-calculated for every modification.

Here, the device 10 according to the invention affords tremendous opportunities for improvements. As a result of the measuring procedure, the reflection behaviour of the item 35 can be characterised and thus an intensity distribution can be calculated which fulfils the required parameters, such as a homogeneous irradiation. The measured values recorded by the sensors 16 in the detector mode are directly connected to the distance of the surface of the item 35 from the sensors 16 used as radiation sources. Furthermore, angles in the surface of the item 35 also have an influence on the measured result. These can also be detected via different arrangements of the sensors 16. The possibilities of use for this are varied, because curved, graduated, interrupted surfaces or combinations of the mentioned characteristics can be irradiated as desired in this way.

Thus, the invention includes a device 10 and a method for measuring, characterising and irradiating objects 35, for example in production sequences. An aspect of the invention is based on the use of LEDs in equal measure as sensors and as radiation sources. In a first operating mode, an LED array is used to investigate an item 35. In the second step, calculated from the information which is obtained and also from parameters to be defined by the operator is an intensity distribution which, in the third step, is achieved by the LEDs. Examples of use include, for example, heating geometrically complex items or irradiating particular materials, for example painted surfaces, in order to trigger chemical processes.

Although the present invention has been described above on the basis of various embodiments, it is not restricted thereto, but can be modified in many different ways. In particular, the invention can be altered or modified in various ways, without departing from the essence of the invention.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method for processing items, the method comprising:
    measuring at least one item using a partial quantity of sensors associated with at least one sensor arrangement having a plurality of sensors;
    determining, by a control means, the impacting of the at least one item with an irradiation means while considering a result of the measuring procedure of the at least one item; and
    irradiating the at least one item by at least a further partial quantity of the plurality of sensors as the irradiation means in an irradiation mode; and
    if appropriate, repeating at least part of the method.

2. The method of claim 1, wherein before the at least one item is measured, a calibration measurement is made, in which the sensors which are used, are in the detection mode.

3. The method of claim 2, wherein in the calibration method all the sensors are in the detection mode.

4. The method of claim 1, wherein the sensors of the arrangement are connected or activated differently such that at least a partial quantity of sensors is operated as the detector means in a detector mode and at least a partial quantity of the sensors is operated as the irradiation means in the irradiation mode.

5. The method of claim 1, wherein the operating modes of the respective partial quantities of sensors change after a predeterminable or predetermined period of time.

6. The method of claim 1, wherein the partial quantities of sensors of the respective mode form a pattern.

7. The method of claim 6, wherein the partial quantities of sensors of the respective mode form a regular pattern.

8. The method of claim 1, wherein disjoint partial quantities of sensors are operated simultaneously as the detector means and as the irradiation means.

9. The method of claim 1, wherein an irradiation, to be carried out, of the item with sensors in an irradiation mode is determined by an iterative process, during the steps of which an intensity variable of the irradiation treatment is repeatedly measured by at least a partial quantity of sensors in the detection mode and is changed by the control means.

10. The method of claim 1, wherein an irradiation, to be carried out, of the item with sensors in an irradiation mode is determined by an iterative process, during the steps of which an intensity variable of the irradiation treatment by sensors in an irradiation mode is calculated analytically and fixed by the control means.

11. The method of claim 1, wherein at least a partial quantity of sensors is activated by the control means such that the surface, to be irradiated, of the item is impacted with a radiation intensity which is uniform over the surface.

12. The method of claim 1, wherein profiled, non-planar structures of the item are also detected in the measuring procedure by at least one of different arrangement patterns of the sensor arrangement and relative positions of the detection means and of the item to be measured, and are then irradiated, if appropriate, after a corresponding calculation.

13. A device for processing items, comprising a detection means including
    at least one sensor arrangement with a plurality of sensors,
        wherein at least a partial quantity of the sensors is configured to measure at least one item in a detection mode;
    wherein a control means is configured to determine an impacting of the item by an irradiation means, while considering a result of the measuring procedure of the at least one item, and
    wherein at least a further partial quantity of the plurality of sensors is configured to irradiate the at least one item as the irradiation means in an irradiation mode.

14. The device of claim 13, wherein the sensors of the sensor arrangement are each formed by a light-emitting diode.

15. The device of claim 13, wherein the each of the sensors of the sensor arrangement can be respectively controlled at least in respect of the radiation intensity thereof, wherein the sensors of the sensor arrangement are formed by diodes of different colours.

16. The device of claim 13, wherein the sensors of the sensor arrangement are formed by diodes of different colours and/or wherein the different colours of the sensors cover a wavelength range of a few 100 nm.

17. The device of claim 13, wherein the sensors of the sensor arrangement can be activated or are activated combined severally together and/or combined into groups, and/or wherein the sensor arrangement of sensors forms at least one array of sensors.

18. The device of claim 17, wherein the array with individual sensors, with partial quantities of sensors or collectively has a regular arrangement with respect to a surface to be irradiated.

19. The device of claim 13, wherein the at least one item and the arrangement of the plurality of sensors are provided such that they are movable relative to one another by at least one adjusting means.

20. The device of claim 13, wherein the at least one item and at least a partial quantity of sensors of the sensor arrangement form mutually parallel surface portions in the position of use.

* * * * *